United States Patent [19]
Williams

[11] 4,026,606
[45] May 31, 1977

[54] CONVEYING LIGHTWEIGHT PLASTIC ARTICLES

[75] Inventor: Dick S. Williams, Creve Coeur, Mo.
[73] Assignee: Monsanto Company, St. Louis, Mo.
[22] Filed: Aug. 21, 1975
[21] Appl. No.: 606,707
[52] U.S. Cl. .................................. 302/2 R; 243/38; 302/64
[51] Int. Cl.² .......................................... B65G 51/02
[58] Field of Search .......... 302/2 R, 64, 66; 193/7, 193/25 R, 255, 32, 40; 243/38; 15/3.13–3.16, 3.21, 88, 104.04, 21 A, 160, 179, 182

[56] References Cited

UNITED STATES PATENTS

| | | | |
|---|---|---|---|
| 3,869,843 | 3/1975 | Darran et al. | 302/64 |
| 3,918,116 | 11/1975 | Valdespino | 302/64 |

FOREIGN PATENTS OR APPLICATIONS

| | | | |
|---|---|---|---|
| 772,959 | 12/1967 | Canada | 302/64 |
| 1,183,885 | 12/1964 | Germany | 15/160 |

Primary Examiner—Evon C. Blunk
Assistant Examiner—Jeffrey V. Nase
Attorney, Agent, or Firm—Michael J. Murphy

[57] ABSTRACT

In conveying lightweight articles such as containers and the like along a tubular passage, improved apparatus is provided comprising a brush-like guide in the passage for scratchless article support during conveying. The process improvement involves cushionably supporting articles formed of an abrasion-sensitive material on the brush-like surface during conveying to substantially avoid surface scuffing.

4 Claims, 5 Drawing Figures

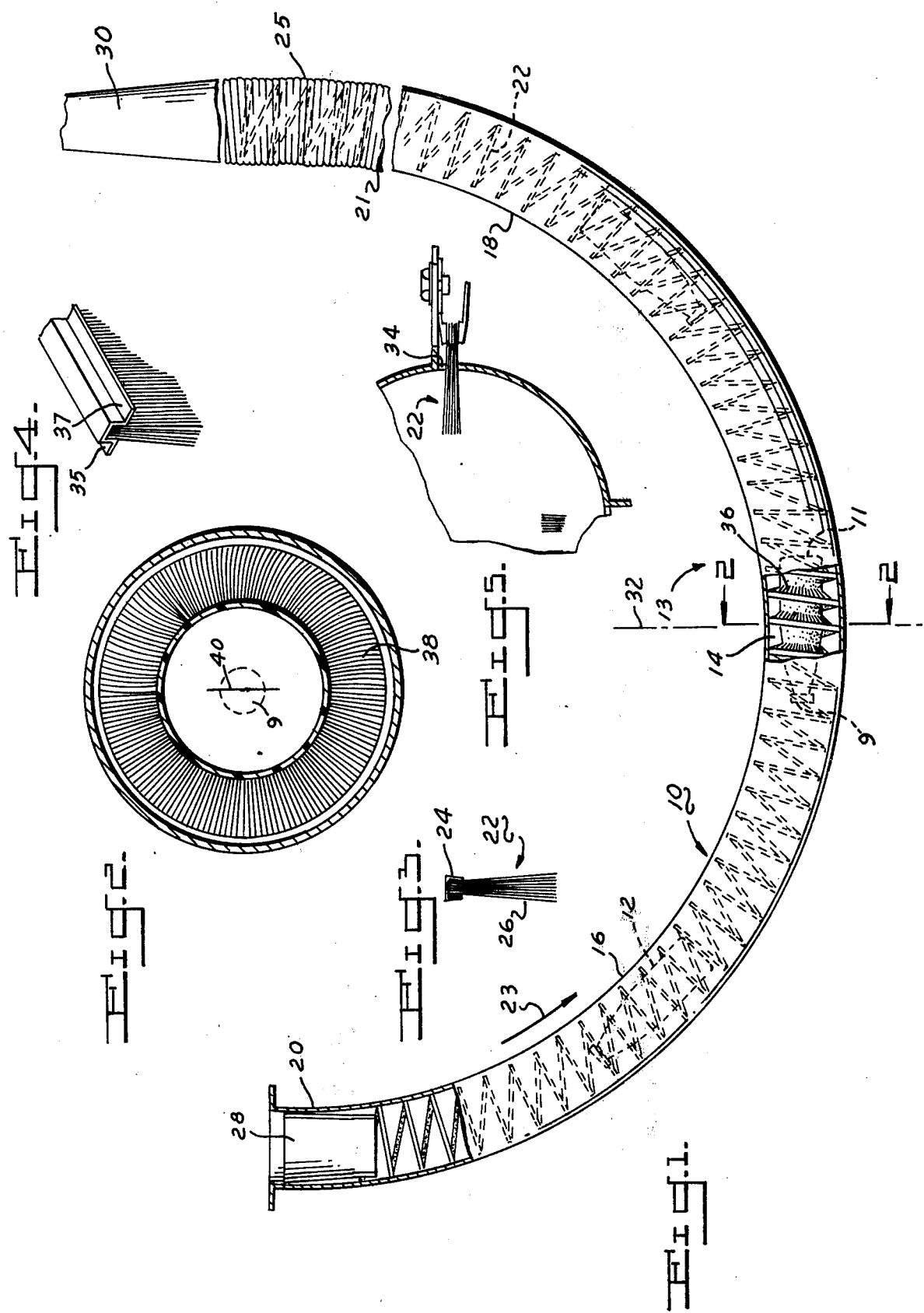

CONVEYING LIGHTWEIGHT PLASTIC ARTICLES

BACKGROUND OF THE INVENTION

This invention relates to conveying articles and more particularly to conveying lightweight articles susceptible to surface scratching.

U.S. Pat. No. 3,869,843 discloses a system for bulk handling of lightweight articles such as thermoplastic containers, e.g. bottles, upstream of a packout station. The conveying ducts shown therein function quite satisfactorily with most articles, however for sensitive end-use applications where consumer appeal is a prime consideration, visible surface marring or scratching of the articles as a result of rather intense frictional rubbing contact with the conveyor surfaces can present problems. With articles formed of thermoplastic material which has been biaxially moleculatly oriented during fabrication to improve impact strength, this problem becomes especially acute. Generally, biaxial orientation involves stretching the material while within a preselected temperature range to align the polymer molecules in the direction of stretch followed by rapid quenching to lock in the stresses developed. When such stretching is carried out in the vertical and horizontal directions in forming a hollow three dimensional article, it has been determined that the resulting improved impact resistance is accomplished at the expense of abrasion resistance in the thickness or $z$ direction. Thus, any substantial rubbing of outer unprotected surfaces of such a molecularly oriented article against another rigid member can cause scratching leaving unsightly, usually powdery white, scuff marks on the outer abraded surfaces. Such scratching has been particularly problematic in fluid pressure conveying of containers such as with the system of the aforementioned patent, especially when transport movement is around a turn where centrifugal force is exerted on the articles.

SUMMARY OF THE INVENTION

Now, however, improvements have been developed for conveying scratchable lightweight articles which overcome these prior art difficulties.

Accordingly, it is a principal object of this invention to provide method and apparatus improvements for conveying abrasion-sensitive articles, such as lightweight containers, without surface scratching thereof.

Another object is to provide an interior guide means within an air conveying passage which will permit substantially scratchless high speed conveying movement of such articles in a bulk handling system, particularly along curved paths.

A further object is to provide such improvements which are particularly useful with articles such as bottles formed of biaxially molecularly oriented thermoplastic materials.

An additional object is to provide an efficient support system for conveying such bottles which provides for distribution of the load primarily generated by centrifugal force over a relatively large area, and which has a low coefficient of friction.

Other objects of this invention will in part be obvious and will in part appear hereinafter from the following description and claims.

These and other objects are accomplished in a conveying system for lightweight articles such as containers and the like which includes a tubular passage for the articles by providing the improvement comprising, in combination, a brush-like guide in such passage for substantially scratchless article support during conveying.

Also provided in a method of conveying hollow, lightweight articles such as containers and the like, formed of an abrasion-sensitive material, is the improvement comprising supporting the articles on a brush-like guide during conveying to substantially avoid surface scratching.

The term "brush-like guide" as used herein comprises a multitude of tightly packed, resilient projecting bristles providing a coefficient of friction with a moving article in contact with them which is sufficently low to avoid substantial surface scratching of the article.

BRIEF DESCRIPTION OF THE DRAWINGS

In describing the overall invention, reference will be made to the accompanying drawings wherein:

FIG. 1 is a partially schematic, elevational view of a conveying system with parts broken away showing one form of the improved interior support of the invention;

FIG. 2 is a sectional view on an enlarged scale along 2—2 of FIG. 1;

FIG. 3 is an elevational view of the internal support of FIG. 1;

FIG. 4 is an alternative embodiment of the portion of the system shown in FIG. 3; and FIG. 5 is a partial, elevational, sectional view similar to FIG. 2 of an alternative embodiment of the invention.

DETAILED DESCRIPTION OF THE ILLUSTRATED EMBODIMENT

Referring now to the drawings, there is shown in FIG. 1, a conveying system generally indicated as 10, for hollow lightweight articles such as containers and the like. Apparatus 10 includes tubular passage 14, defined in FIG. 1 by the walls of a pair of gently curving, close coupled, 90° large radius, light gauge, rigid, metal ells 16, 18, exemplarily illustrated in 180° form, and collectively identified as 13. Passage 14 may, of course, alternatively be directed in any other curved or straight direction, such orientation usually depending on the layout of adjacent components of the overall system. The walls of ells 16, 18 which circumscribe passage 14 are circumferentially closed in FIG. 1, as illustrated by thickness 20, but alternatively could comprise a series of curved or straight, adjacent, rigid support rails forming a cage open between adjacent rails to the surroundings, as depicted in FIG. 11 of the aforementioned U.S. Pat. No. 3,896,843 such rails circumscribing a passage similar to 14 for captively confining an article between them during conveying travel. The conveying duct could also be flexible, as schematically illustrated at 25 on the right in FIG. 1, such being particularly advantageous at the inlet to the system since its location can be varied to compensate for construction and fabrication tolerances of adjacent equipment components. Duct 25 is commercially available and may comprise a series of circular coils, as shown, interlocked in such manner that the assembly is flexible and therefore positionally adjustable.

In accordance with the invention, a continuous, brush-like guide illustrated in cross section at 22 in FIG. 3, is within tubular member 13 for supporting articles 12 during conveying movement. Guide 22 in cross section comprises metal backing strip 24 crimped tightly around rear portions of yieldable, projecting, synthetic plastic bristles 26, preferably formed of nylon. As shown and preferred, bristles 26 are substantially straight in unstressed condition, are free of crimps and kinks and are each on the order of about 0.005 to 0.05 cm., e.g. 0.0125 cm., in substantially constant diameter. It should be realized, however, that bristles 26 may vary from such characteristics; for example, they may vary in diameter as well as in length to give variable modulus and may vary in density, for example, range from about 500 to 4000 in number per sq. in. of area depending on bristle stiffness and the type of article being conveyed. Also, alternative types of bendably resilient rod-like members, either natural or synthetic, may be used instead of the nylon bristles depicted in FIG. 3, such as horsehair, polypropylene, polyester and the like and combinations of same. Though the arrangement of brush guide 22 within conduit 13 may also vary, as illustrated by contrasting FIGS. 1 and 5, such guide is preferably in the form of a helical coil winding along the inside of duct 13, as generally illustrated in FIG. 1, with backing member 24 compressively frictionally engaged with the inner surface of conduit 13 and bristles 26 projecting radially inwardly into passage 14. The pitch (i.e. linear distance between immediately adjacent coils of guide 22 when within duct 13) is related to the width and length of the article being conveyed and should not be too small else excessive resistance to conveying movement will result, nor too great for a given sized article else the forward or rearward end of the article may tend to scrape along the wall of the duct or backing member 24 of the brush guide. Pitch lengths on the order of from about 3.0 to 12 cm. have been used successfully to achieve the intended scratchless conveying support, to be presently described.

To assemble the system in the manner illustrated in FIG. 1, the outer diameter of the coil when immediately adjacent coils are compressed against each other prior to insertion within duct 13, should be slightly greater than the inside diameter of the duct, such that the coil may be frictionally held in place against the inner duct walls, including any flexible portion 25, on being pulled therethrough.

In the embodiment of the system illustrated in FIG. 5, brush-like guide 22 projects through slots 34 in the duct wall which slots are linearly and circumferentially staggered along the length of the tube. The arrangement illustrated in FIG. 4 provides a somewhat different contour of backing strip in that flanges 35 and 37 may be bolted directly to appropriate slots or mating flanges formed in the conveying duct.

In operation, a method is provided for conveying hollow lightweight articles such as containers, wherein outer surface portions are formed of an abrasion-sensitive material, for example, scratchable biaxially molecularly oriented 70/30 weight % acrylonitrile/styrene polymer displaying a strength weakness through its thickness. Though the level of such molecular orientation may vary in localized surface portions of an article and may not even be present at all in certain portions, it also usually varies through the wall thickness of a three dimensional article so as to be greater adjacent the outer surface than adjacent the inner surface, although the reverse could also be true. Levels of orientation as low as about 3.5 kg./cm.$^2$ orientation release stress can present the abrasion problems during conveying with which the present invention is concerned.

Other similar types of polymers known to be susceptible to this type of scratching comprise those wherein a major portion (at least 55 weight percent) is a polymerized nitrile-group-containing monomer.

Although the system of the invention is preferably employed with plastic material which has biaxially molecularly oriented portions susceptible to surface scratching, it is equally effective with any type of lightweight article which is relatively smooth in outer surface contour, is without severe dimensional changes and is susceptible to surface marring or scratching during rubbing contact with other materials. Though article contour may vary widely, the preferred shape is that of a bottle sloping inwardly from the major body diameter toward an open end to form a neck reduced in diameter on the order of 50% or less with respect to the main body portion, and preferably characterized as weighing from about 0.03 to 0.13 gr./cc. of internal volume.

In the embodiment illustrated, bottles 12, of circular shape in plan view, are inserted, with either open end 9 or base 11 directed forward or rearward as desired, seriatim, either manually or automatically, into the system via chute 28 at the inlet end, and are propelled forward in the direction of arrow 23 toward upwardly directed outlet end 30 in the direction of their lengthwise axes via a suitable negative or positive fluid (e.g. air) pressure within duct 13. Such pressure may, for example, be generated by an eductor system using a venturi to generate a negative pressure or by a positive pressure blower. Alternatively, such articles 12 could be propelled forward under the influence of a suitable mechanical system, or the like, not shown, or even under the influence of gravity. In accordance with the method of the invention, during such conveying movement, outer surface portions of bottles 12 come into successive sliding contact with localized areas of the bristles 26 of spirally configured brush guide 22 within duct 13, and are cushionably supported usually along the upper end portions of bristles 26, so as to substantially avoid the outer surface scratching which otherwise occurs when such bottles carom along the inner surface of the conveying duct without such a guide.

In the embodiment of FIG. 1 wherein duct 12 is curved in forward contour so that directional turning occurs during advancement, for example through the 180° illustrated, a rather substantial centrifugal force directed outwardly along the radius of curvature is exerted on each bottle 12, which in the past has caused especially severe scratching of portions of the semicircular half of the main body section which happens to be facing outwardly in the direction of the force, for example during travel through the area immediately on either side of and along centerline 32. In accordance with the invention, on propulsion of bottle 12 outwardly in such area around 32 against the numerous bristles 26 situated in such area where perhaps about 2 to 4 coils of the guide 22 are present, the bristles bend forwardly in the direction of bottle movement along their length and present a relatively large surface to only about the outer semicircular one half of the large diameter bottle body and, because of such rather substantial bristle-bottle contact area, a relatively low coefficient of friction results between the bottle surface and bristles support. This results in distribution of the centrifugal force over a relatively large area, thereby effectively dissipating it and avoiding scratching the sensitive outer bottle surface. Such bending or forward deflecting of the bristles 26 on the right of vertical duct centerline 40 as viewed in FIG. 2 is noted at 36 in FIG. 1. As shown at 38 in FIG. 2, bristles 26 in the area of passage 14 being discussed, may also be collapsibly compressed somewhat outwardly under the influence of the centrifugal force when supporting bottle 12 in the manner shown. The extent of bending bristle movement will vary with the resiliency of the bristle used, the weight and shape of the article being conveyed and the presence and magnitude of the centrifugal force. For straight duct runs with light articles, bristles 26 may remain substantially upright when in contact with the articles being conveyed.

The illustrated, centrifugal-force-distributing helical bristle pattern is preferred since the combination of the outer surface of each bottle in contact along its length with plural coils of the surrounding compressed bristles creates a form of seal at each bottle position within passage 14, which, for a pneumatic system, decreases the amount of conveying air necessary to move the articles through a given conveying length, versus a straight line or non-coiled arrangement wherein such individual seals are not present and efficiency-decreasing conveying air losses can be substantial due to circulation through open spaces around the individual articles. Such helical pattern with plural seals also can create a shock-absorbing effect in that an air cushion may be established between adjacent bottles, which can serve to prevent damage to articles which are fragile to impact. For example, if the lead article being conveyed stops moving, maybe because of accumulator backup, the next successive article because of such air cushion created by the container-bristle seal at the prior article, can be prevented from impacting the rearmost end of the first article, which end might be susceptible to breakage under such conditions. Also, if it is important that the articles being conveyed arrive at the next downstream station at approximately the same spaced intervals as existed on successive introduction into the conveying system, the container-seal effect may help to maintain such spacing during conveying movement. Finally, such circumferential seals as established between articles and surrounding helical coils can have a cleansing effect, and if the correct combination of materials are used, even a polishing effect on the outer surface of the articles.

Although the prior art conveying problems and the embodiment of the invention described heretofore discloses the system of the invention as used in handling scratchable plastic containers, it will be understood that the invention is entirely applicable to scratchable articles other than such containers which are of various shapes and forms, and whereeever it is desired to transport such articles along a tubular path in a confined manner in any direction between successive work stations.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a method of air conveying bottles along a curved path weighing between about 0.03 to 0.13 gr./cc. of internal volume and formed of a biaxially molecularly oriented thermoplastic material having wall portions with orientation levels of at least about 3.5 kg./cm.$^2$ orientation relief stress, the improvement comprising:

successively cushionably supporting such bottles on their outer surfaces including such molecularly oriented wall portions, on yieldable bristles having a diameter of about 0.005 to 0.05 cm. and a bristle density of about 500 to 4000 per square inch of area as they proceed along such curved path to substantially avoid surface scratching of such wall portions during said conveying movement.

2. The process of claim 1 wherein at any instant during said conveying each such bottle is resiliently supported on plural coils of a brush-like guide containing such bristles and out of rubbing contact with adjacent surfaces of a passage establishing such path.

3. The process of claim 1 wherein the thermoplastic material comprises a major portion of a polymerized nitrile-group-containing monomer.

4. The process of claim 1 wherein the orientation levels decrease inwardly through the thickness from a high level on or adjacent the outer surface.

* * * * *